US007903579B2

(12) United States Patent
Hughes et al.

(10) Patent No.: US 7,903,579 B2
(45) Date of Patent: Mar. 8, 2011

(54) SELF-OPTIMIZATION AND SELF-HEALING OF VOICE QUALITY PROBLEMS UTILIZING SERVICE ORIENTED ARCHITECTURE

(75) Inventors: Robert C. Hughes, Pleasantville, NY (US); Andrew Liam Massey, Madrid (ES); William H. Tworek, Hopkinton, NH (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 12/198,446

(22) Filed: Aug. 26, 2008

(65) Prior Publication Data

US 2010/0054118 A1 Mar. 4, 2010

(51) Int. Cl.
*H04L 12/26* (2006.01)
(52) U.S. Cl. .......................................... 370/252; 370/216
(58) Field of Classification Search .................. 370/252, 370/352, 241; 379/32.1; 705/80
See application file for complete search history.

(56) References Cited

U.S. PATENT DOCUMENTS

| 6,598,183 | B1 | 7/2003 | Grieco et al. | |
|---|---|---|---|---|
| 7,653,002 | B2* | 1/2010 | Hardy et al. | 370/252 |
| 2004/0151127 | A1 | 8/2004 | Chong | |
| 2005/0281204 | A1 | 12/2005 | Karol et al. | |
| 2006/0098625 | A1 | 5/2006 | King et al. | |
| 2006/0221942 | A1 | 10/2006 | Fruth et al. | |
| 2007/0019559 | A1 | 1/2007 | Pittelli et al. | |
| 2007/0019618 | A1* | 1/2007 | Shaffer et al. | 370/352 |
| 2007/0127384 | A1 | 6/2007 | Chandrupatla et al. | |
| 2007/0195707 | A1* | 8/2007 | Cidon et al. | 370/252 |
| 2007/0286351 | A1* | 12/2007 | Ethier et al. | 379/32.01 |
| 2008/0313090 | A1* | 12/2008 | Portman et al. | 705/80 |
| 2009/0003219 | A1* | 1/2009 | Beacham et al. | 370/241 |
| 2009/0168661 | A1* | 7/2009 | Lingafelt et al. | 370/252 |

FOREIGN PATENT DOCUMENTS

| JP | 2005072957 A1 | 3/2005 |
|---|---|---|
| JP | 2007181167 A1 | 7/2007 |

* cited by examiner

*Primary Examiner* — Kwang B Yao
*Assistant Examiner* — Syed M Bokhari
(74) *Attorney, Agent, or Firm* — Schmeiser, Olsen & Watts; Douglas Lashmit

(57) ABSTRACT

A method and system for automatically resolving a voice transmission problem in real time in a communication system. Service oriented architecture (SOA)-based reporter services report voice transmission characteristic measurements. An enterprise service bus aggregates the measurements into a combination of measurements. An analyzer that is a SOA service provider determines that the combination of measurements indicates a voice transmission problem. The voice transmission problem determination includes identifying a match between the combination of measurements and a pattern of predefined conditions stored in a database. The database associates the pattern with one or more corrective actions. Using the database, the analyzer identifies the one or more corrective actions that are associated with the pattern of predefined conditions. SOA-based fixer services execute the corrective action(s) to resolve the voice transmission problem. As new voice transmission problems become known, the system expands to add reporting services and fixer services.

4 Claims, 3 Drawing Sheets

US 7,903,579 B2

SELF-OPTIMIZATION AND SELF-HEALING OF VOICE QUALITY PROBLEMS UTILIZING SERVICE ORIENTED ARCHITECTURE

FIELD OF THE INVENTION

The present invention relates to a data processing method and system for addressing issues affecting the quality of a real-time communications system, and more particularly to a service oriented architecture-based technique for self-optimization and self-healing of voice quality problems in a real-time communications system.

BACKGROUND OF THE INVENTION

Known real-time communications systems (e.g., Voice over Internet Protocol (VoIP) telephone systems) are able to alert end users of communication problems (i.e., when the quality of the VoIP telephone call falls below a predefined threshold), but do not have flexible capabilities to adequately monitor and resolve new communication problems. Furthermore, conventional real-time communications systems are limited because communication problems are identified based on error conditions that are considered individually. Thus, there exists a need to overcome at least one of the preceding deficiencies and limitations of the related art.

SUMMARY OF THE INVENTION

The present invention provides a computer-implemented method of automatically resolving a voice quality problem in real time in a communication system. Reporter services in a computing system report measurements of characteristics of a voice transmission. The reporter services are service-oriented architecture (SOA) service requesters. An enterprise service bus (ESB) included in the computing system aggregates the measurements into a combination of measurements. An analyzer included in the computing system determines that the combination of measurements indicates a voice quality problem. The determination that the combination of measurements indicates the voice quality problem includes an identification of a match between the combination of measurements and a pattern of predefined conditions stored in a database residing in a computer data storage unit. The analyzer is a SOA service provider. The analyzer identifies one or more corrective actions. The one or more corrective actions are associated in the database with the pattern of predefined conditions. One or more fixer services included in the computing system executes the one or more corrective actions. A result of executing the corrective action(s) is a resolution of the voice quality problem. The one or more fixer services are SOA service providers.

A system and a computer program product corresponding to the above-summarized methods are also described and claimed herein.

DETAILED DESCRIPTION OF THE INVENTION

Overview

The present invention provides a system and method that yields real time correction of voice quality issues (i.e., problems) using service-oriented architecture (SOA) and complex event processing. The system described herein includes voice transmission status reporting services that monitor at an end user device for voice quality problems in a real time communications system (e.g., a VoIP telephone system). The monitoring services may additionally be located at any point along the call path and may monitor the state of all devices through which the call flows. The system described herein is self-healing by means of fixer services (i.e., problem resolution services) that are included in the system and that perform real time corrective actions that automatically resolve voice quality problems that are reported by the reporting services. The corrective actions, for example, prevent an end user from experiencing a poor quality voice transmission or abandoning a telephone call. As new voice quality problems become known, the SOA aspects of the present invention allow the system to expand to add monitoring services and fixer services. The system also includes a repository of combinations (i.e., aggregations) of possible conditions, where each combination is associated with one or more problem resolution service(s) that fix a voice quality problem caused by the combination. These combinations allow the system to address voice quality problems that are based on additive conditions. For example, the system provides a real time resolution to poor voice quality caused by the combination of background noise on client A plus network congestion plus low levels of a speaker's voice volume on agent B.

Voice Quality Problem Identification and Resolution System

Figure 1:
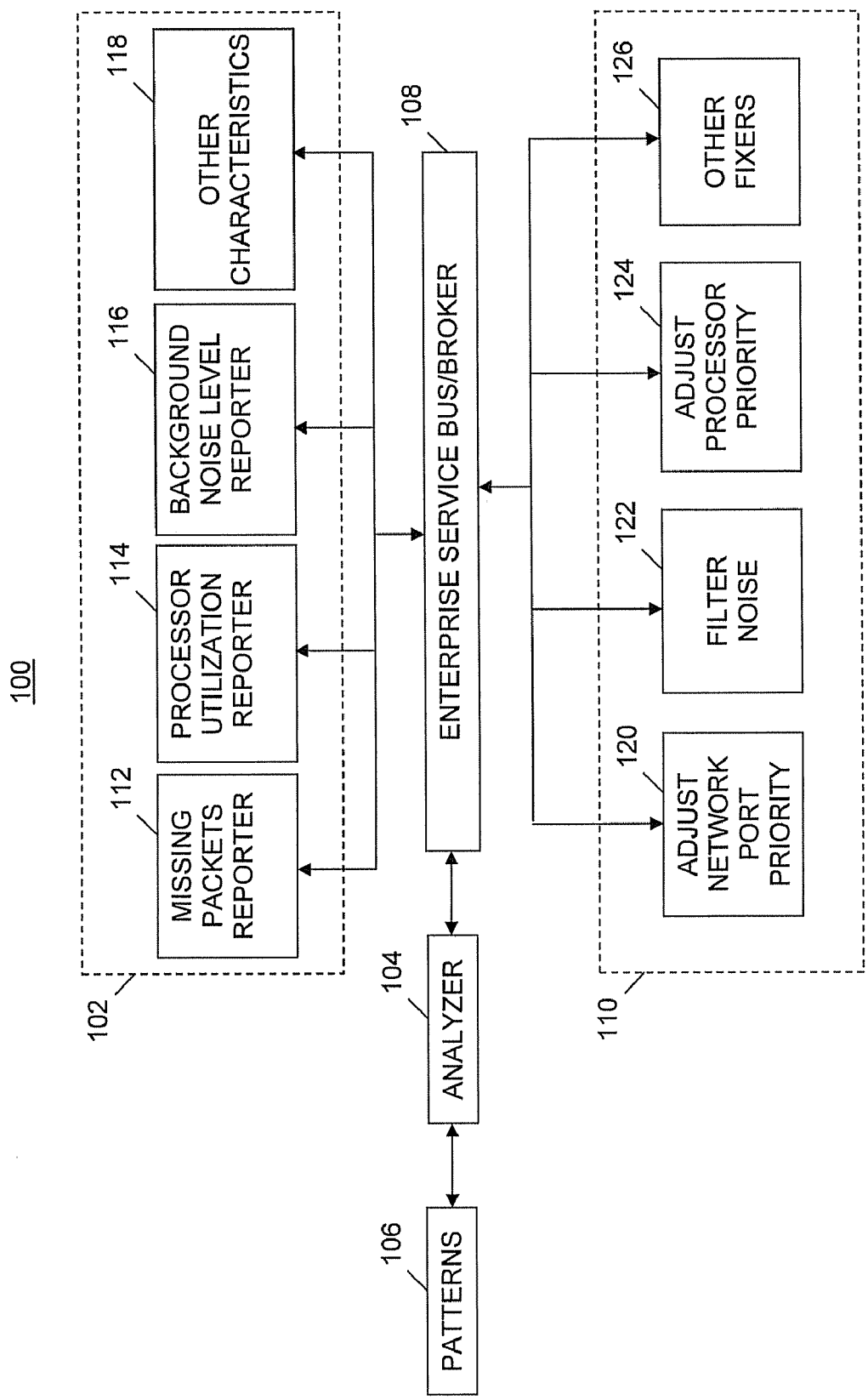
FIG. 1 is a block diagram of a service oriented architecture-based system for identifying and resolving voice quality problems, in accordance with embodiments of the present invention.

FIG. 1 is a block diagram of a service oriented architecture-based system for identifying and resolving voice quality problems, in accordance with embodiments of the present invention. System 100 includes voice status services 102 (a.k.a. reporter services, reporting services or reporters), a software-based analyzer component 104, patterns 106, an enterprise service bus (ESB)/broker 108, and voice problem resolution services 110 (a.k.a. fixer services or fixers). Voice status services 102 take measurements on specific characteristics of a real-time communications system and report the measurements that exceed predefined thresholds associated with the variables. The voice status services 102 may range from being very dumb (e.g., processor utilization) or having intelligence (e.g., International Telecommunication Union (ITU) Perceptual Evaluation of Speech Quality (PESQ) probe).

A voice status service may provide real-time data on a streaming business or wait to provide data only in response to a threshold being exceeded. Voice status services 102 do not have knowledge of voice quality problems, do not know how to fix voice quality problems, and are unaware of fixers 110. As each voice status service 102 is identifying a threshold exception and requesting a resolution, the voice status service is a SOA service requester.

In one embodiment, voice status services 102 include a missing packets reporter 112, a processor utilization reporter 114, a background noise level reporter 116, and may optionally include one or more reporters of other characteristics 118. Reporter 112 tracks the number of packets that are missing in a voice transmission and compares the tracked number of missing packets to a predefined missing packets threshold value. If the predefined missing packets threshold value is exceeded by the number of missing packets in a voice transmission, then reporter 112 reports that the missing packets threshold value is exceeded. Reporter 114 measures the utilization of a computing processor that processes a voice transmission and compares the measured processor utilization to a predefined processor utilization threshold value. If the predefined process utilization threshold value is exceeded by the processor utilization for a voice transmission, then reporter 114 reports that the processor utilization threshold value is exceeded. Reporter 116 measures a level of background noise associated with a voice transmission and compares the measured background noise level to a predefined background noise threshold value. If the predefined background noise threshold value is exceeded by the background noise level measured for a voice transmission, then reporter 116 reports that the background noise threshold is exceeded.

Although the measurements provided by reporters in voice status services 102 may not individually indicate any voice quality problem that requires action, a combination of two or more of the measurements may exceed a predefined additive threshold that indicates that an action is required to resolve a voice quality problem.

In an alternate embodiment, voice status services 102 are not included in system 100. In this alternate embodiment, system 100 receives voice quality data from one or more existing reporter products. In still another embodiment, system 100 includes one or more reporters in voice status services 102 and also leverages one or more existing products that report voice quality data.

Analyzer 104 is a SOA service provider that receives data from voice status services 102 and maintains a complex state for a communications session. In response to the complex state changing, analyzer 104 compares the complex state with available patterns. If the comparison with the patterns yields a match, then analyzer 104 invokes an action through ESB 108. An aggregator (not shown) tracks results of fixes (a.k.a. corrective actions) taken by fixers 110. The results tracked by the aggregator allow system 100 to self-optimize. That is, the tracked results allow analyzer 104 to learn whether or not prior attempts to resolve a voice quality problem were successful. Further, analyzer 104 uses this learned information to more quickly determine solutions in future attempts to resolve voice quality issues. For example, voice quality issues A and B are identified, and fix X is recommended by system 100 to resolve the combination of issue A and issue B (a.k.a. A+B). Since fix X is not successful at fixing A+B, patterns database 106 is updated to indicate the failure of fix X to resolve A+B (e.g., the patterns database is updated to reduce a rating associated with fix X as a possible solution for A+B).

A pattern in the available patterns 106 is a complex statement of events with a matching set of instructions for one or more corrective actions. In one embodiment, a pattern is expressed as a Boolean string (e.g., If condition A and condition B and not condition E, then take action X and action Z).

ESB/broker 108 is a flexible connectivity infrastructure for integrating applications and services and for managing SOA service requesters and service providers, including reporters 102 and fixers 110.

Fixers 110 are SOA service providers that provide services that take corrective actions as specified by ESB 108. For example, a fixer 110 may give processor priority to voice services or temporarily reduce the priority of resource-hungry services (e.g., mail download). In one embodiment, fixers 110 include an adjust network port priority fixer 120, a filter noise fixer 122, and adjust processor priority fixer 124 and may optionally include other fixers 126. Fixer 120 adjusts a priority of a network port being utilized by a voice transmission. Fixer 122 filters a noise level in a voice transmission. Fixer 124 adjusts a priority of a processor that processes a voice transmission.

By using the SOA features discussed above and the ESB 108, the present invention provides a scalable and reliable system 100 that ensures open compatibility with any voice technology.

Voice Quality Problem Identification and Resolution Process

Figure 2:
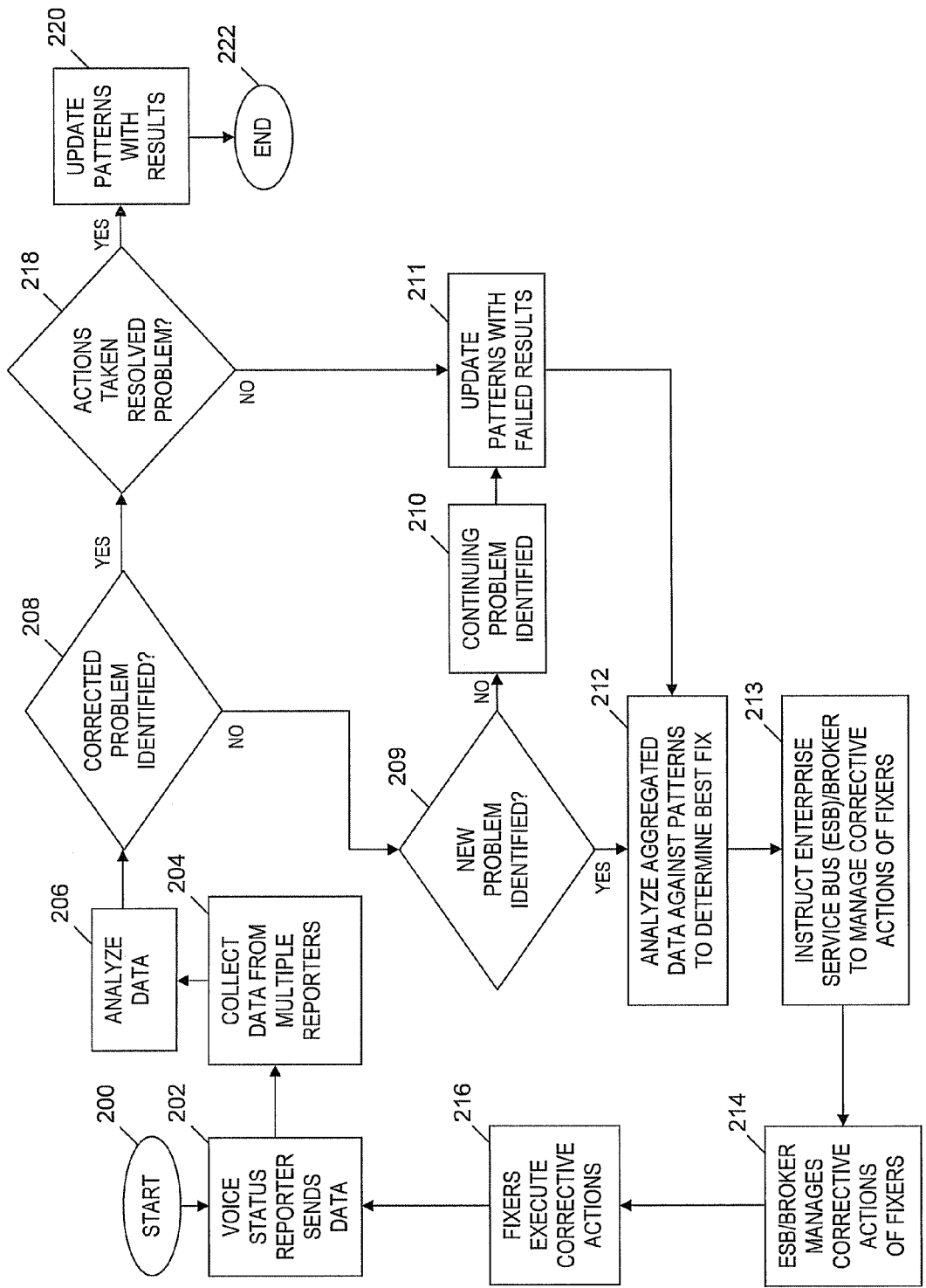
FIG. 2 is a flowchart of a voice quality problem identification and resolution process implemented in the system of FIG. 1, in accordance with embodiments of the present invention.

FIG. 2 is a flowchart of a voice quality problem identification and resolution process implemented in the system of FIG. 1, in accordance with embodiments of the present invention. The voice quality problem identification and resolution process starts at step 200 with an end user experiencing a problem with voice quality in a real time communication system (e.g., a VoIP telephone system). In step 202, reporters 102 (see FIG. 1) report measurements of characteristics related to the voice transmission (e.g., processor utilization and background noise level measurements). In step 204, the analyzer 104 (see FIG. 1) collects event data sent from multiple reporters 102 (see FIG. 1), including processor utilization reporter 114 (see FIG. 1) and background noise level reporter 116 (see FIG. 1).

In order to address a voice quality problem that is new, one or more reporters may be dynamically added to voice status services 102 (see FIG. 1) after a prior performance of one or more steps of the process of FIG. 2. Such newly added reporters report their results to analyzer 104 (see FIG. 1) in step 204.

In step 206, analyzer 104 (see FIG. 1), having received the data collected in step 204 as events, maintains a complex state for the communications session that includes the voice transmission. Furthermore, in step 206, analyzer 104 (see FIG. 1) determines whether one or more measurements received from reporters 102 (see FIG. 1) exceed one or more predefined thresholds, where each measurement is uniquely associated with one of the predefined thresholds. For example, analyzer 104 (see FIG. 1) determines whether a measurement for processor utilization exceeds a first predefined threshold for processor utilization and whether a measurement for background noise level exceeds a second predefined threshold for background noise. Analyzer 104 also determines whether a combination of measurements received from reporters 102 (see FIG. 1) exceeds a predefined threshold associated with the combination, thereby requiring an action to resolve a voice quality problem.

The determinations made in step 206 indicate whether the voice quality problem being processed is a corrected problem, a new problem or a continuing problem. As used herein, a corrected problem (a.k.a. corrected voice quality problem) is defined as a voice quality problem resolved by one or more corrective actions that were previously executed by the process of FIG. 2. As used herein, a new problem (a.k.a. new voice quality problem) is defined as a voice quality problem for which no corrective action has yet been executed by the process of FIG. 2. As used herein, a continuing problem (a.k.a. continuing voice quality problem) is defined as a voice quality problem that was not resolved by any corrective action previously executed by the process of FIG. 2.

If analyzer 104 (see FIG. 1) determines in step 208 that the voice quality problem is not a corrected problem, then the process of FIG. 2 continues with step 209. If analyzer 104 (see FIG. 1) determines in step 209 that the voice quality problem is not a new problem, then the analyzer identifies the voice quality problem as a continuing problem in step 210. In step 211, broker 108 (see FIG. 1) updates patterns 106 (see FIG. 1) with "failed" results (i.e., one or more actions that were taken to attempt to resolve a voice quality problem, where the one or more actions did not correct the voice quality problem).

Step 212 follows step 211 and also follows the Yes branch of inquiry step 209 (i.e., determining that the voice quality problem is a new problem). In step 212, analyzer 104 (see FIG. 1) aggregates the data collected in step 204 and analyzes the aggregated data to determine the one or more corrective actions that are the best fix for the voice quality problem. As part of the analysis in step 212, analyzer 104 (see FIG. 1) compares the aggregated data and the complex state maintained by the analyzer to patterns 106 (see FIG. 1), which are retrieved from a database residing on a computer data storage unit. The comparison to patterns 106 (see FIG. 1) in step 212 locates a pattern in patterns 106 (see FIG. 1) that matches the aggregated data and complex state. Using the matching pattern located in step 212, analyzer 104 (see FIG. 1) identifies the one or more corrective actions that are associated with the matching pattern in the database that stores patterns 106 (see FIG. 1).

Any fixers that have been added to voice problem resolution services 110 (see FIG. 1) since a previous performance of one or more steps of the process of FIG. 2 are also engaged by analyzer 104 (see FIG. 1) in step 212. Such newly added fixers may have been added to address a voice quality problem that is new.

In step 213, analyzer 104 (see FIG. 1) instructs ESB/broker 108 (see FIG. 1) to manage the one or more corrective actions determined in step 212, where the one or more corrective actions are to be performed by one or more fixers included in fixers 110 (see FIG. 1). In step 214, ESB/broker 108 (see FIG. 1) manages the one or more fixers included in fixers 110 (see FIG. 1) performing the one or more corrective actions determined in step 210. Step 214 includes ESB/broker 108 (see FIG. 1) locating and activating the one or more fixers that are needed to perform the one or more corrective actions. In step 216, the one or more fixers included in fixers 110 (see FIG. 1) are executed and complete the one or more corrective actions determined in step 212. Following step 216, the voice quality problem identification and resolution process repeats starting at step 202.

Returning to step 208, if analyzer 104 (see FIG. 1) determines that the analysis performed in step 212 and actions taken subsequent to step 212 correct the current voice quality problem, the Yes branch of step 208 is taken and the process continues with step 218. In inquiry step 218, data relative to the voice quality problem, the one or more corrective actions taken to resolve the problem, and the results of talking the one or more corrective actions are reported to broker 108 (see FIG. 1). If analyzer 104 (see FIG. 1) determines in step 218 that the one or more corrective actions resolved the voice quality problem, then the process continues with step 220; otherwise, the process continues at step 211 by updating patterns 106 (see FIG. 1) with the "failed" results and then performing the steps that follow step 211, as discussed above. In step 220, which follows the Yes branch of step 218, broker 108 (see FIG. 1) updates patterns 106 (see FIG. 1) with results based on the one or more corrective actions that resolved the voice quality problem. The updated patterns 106 (see FIG. 1) are used in a resolution of a future voice quality problem via the process of FIG. 2. In step 222, the voice quality problem identification and resolution process ends.

EXAMPLE

This section includes one example of a resolution of a voice quality problem. The steps in the example are related to corresponding steps in FIG. 2. In this example, a voice transmission status reporter reports processor utilization data (see step 202). Multiple reporter services 102 (see FIG. 1) send data to be aggregated, including processor utilization and background noise level data (see step 204).

The analyzer 104 (see FIG. 1) determines that neither processor utilization nor background noise exceeds corresponding predefined threshold values. The analyzer determines, however, that the pattern of the aggregated data indicates that a new voice quality problem exists (see step 206, the No branch of step 208 and the Yes branch of step 209). Using patterns 106 (see FIG. 1), the analyzer 104 (see FIG. 1) determines the following fixes: that voice application priority must be given processor priority level X and that a noise reduction routine must be invoked (see step 212) as corrective actions. The analyzer 104 (see FIG. 1) instructs ESB 108 (see FIG. 1) to manage the flow of the aforementioned fixes (see step 213).

ESB 108 (see FIG. 1) finds and activates the appropriate fixer services (e.g., adjust processor priority fixer 124 (see FIG. 1) and filter noise fixer 122 (see FIG. 1)) that are needed to perform the aforementioned fixes (see step 214). The activated fixer services execute and complete the fixes to attempt to resolve the voice quality problem (see step 216).

The reporter services again send processor utilization and background noise level data that is aggregated (see steps 202 and 204). The analyzer 104 (see FIG. 1) analyzes the aggregated data and identifies the previously processed voice quality problem as a corrected voice quality problem (see step 206 and the Yes branch of step 208). Data regarding the voice quality problem, the fixes completed by the fixer services, and the results of the fixes are reported to the broker 108 (see FIG. 1) and the corrective actions previously executed in step 216 are determined to have resolved the voice quality problem (see the Yes branch of step 218). Using the reported data, the broker 108 (see FIG. 1) updates the patterns 106 (see FIG. 1) as needed for future use in the resolution of other voice quality problems (see step 220).

In an alternate example that uses the same steps discussed above through step 216 and the repetition of steps 202 and 204, the analyzer 104 (see FIG. 1) then analyzes the aggregated data, determines that the voice quality problem is not a corrected voice quality problem, and determines that the voice quality problem is not a new voice quality problem (see step 206, the No branch of step 208, and the No branch of step 209). The analyzer 104 (see FIG. 1) then identifies the voice quality problem as a continuing problem (see step 210) and the patterns 106 (see FIG. 1) are updated (see step 211). The update of the patterns includes decreasing a ranking or rating associated with the corrective actions that were previously executed in step 216 (i.e., giving processor priority X to the voice application and invoking the noise reduction routine) in an attempt to resolve the voice quality problem. The decreased ranking or rating allows the voice quality problem identification and resolution system to learn what corrective actions failed to resolve the voice quality problem, thereby allowing the system to self-optimize in response to identifying the same voice quality problem in the future. That is, in this alternate example, a future identification of the same voice quality problem results in a determination of a different set of one or more corrective actions (i.e., a set of one or more corrective actions that are ranked or rated more highly than the previously executed corrective actions whose ranking or rating was decreased in step 211).

Computing System

Figure 3:
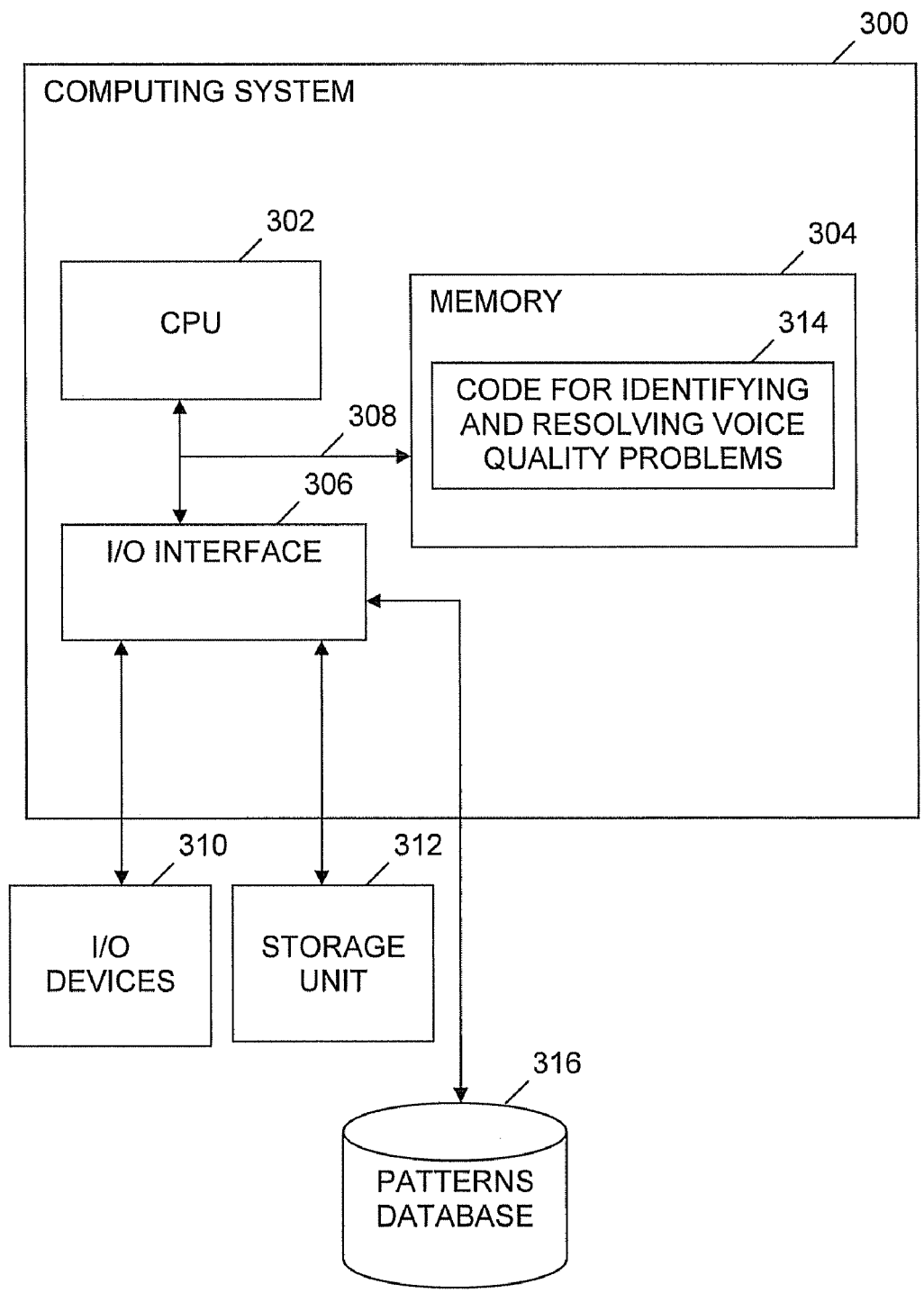
FIG. 3 is a block diagram of a computing system that includes the system of FIG. 1 and that implements the process of FIG. 2, in accordance with embodiments of the present invention.

FIG. 3 is a block diagram of a computing system that includes one or more components of the system of FIG. 1 and that implements the process of FIG. 2, in accordance with embodiments of the present invention. Computing system 300 generally comprises a central processing unit (CPU) 302, a memory 304, an input/output (I/O) interface 306, and a bus 308. Further, computing system 300 is coupled to I/O devices 310 and a computer data storage unit 312. CPU 302 performs computation and control functions of computing system 300. CPU 302 may comprise a single processing unit, or be distributed across one or more processing units in one or more locations (e.g., on a client and server).

Memory 304 may comprise any known type of computer data storage and/or transmission media, including bulk storage, magnetic media, optical media, random access memory (RAM), read-only memory (ROM), a data cache, a data object, etc. In one embodiment, cache memory elements of memory 304 provide temporary storage of at least some program code in order to reduce the number of times code must be retrieved from bulk storage during execution. Moreover, similar to CPU 302, memory 304 may reside at a single physical location, comprising one or more types of data storage, or be distributed across a plurality of physical systems in various forms. Further, memory 304 can include data distributed across, for example, a local area network (LAN) or a wide area network (WAN).

I/O interface 306 comprises any system for exchanging information to or from an external source. I/O devices 310 comprise any known type of external device, including a display device (e.g., monitor), keyboard, mouse, printer, speakers, handheld device, facsimile, etc. In one embodiment, an I/O device 310 such as a display device displays the patterns 106 (see FIG. 1) that are updated as a result of step 220 (see FIG. 2) and/or the best fix determined in step 210 (see FIG. 2). Bus 308 provides a communication link between each of the components in computing system 300, and may comprise any type of transmission link, including electrical, optical, wireless, etc.

I/O interface 306 also allows computing system 300 to store and retrieve information (e.g., program instructions or data) from an auxiliary storage device such as computer data storage unit 312. The auxiliary storage device may be a non-volatile storage device, such as a hard disk drive or an optical disc drive (e.g., a CD-ROM drive which receives a CD-ROM disk). Computer data storage unit 312 is, for example, a magnetic disk drive (i.e., hard disk drive) or an optical disk drive.

Memory 304 includes computer program code 314 that provides the logic for automatically identifying and resolving voice quality problems (e.g., the process of FIG. 2). In one embodiment, computer program code 314 provides the functionality of reporters 102 (see FIG. 1), analyzer 104 (see FIG. 1), ESB/broker 108 (see FIG. 1) and/or fixers 110 (see FIG. 1). In another embodiment, system 100 (see FIG. 1) does not include reporters 102 and computer program code 314 provides the functionality of analyzer 104 (see FIG. 1), ESB/broker 108 (see FIG. 1) and/or fixers 110 (see FIG. 1). Further, memory 304 may include other systems not shown in FIG. 3, such as an operating system (e.g., Linux) that runs on CPU 302 and provides control of various components within and/or connected to computing system 300. Still further, memory 304 may include the complex state maintained by analyzer 104 (see FIG. 1).

Patterns 106 (see FIG. 1) are stored in a patterns database 316, which may reside in storage unit 312 or in another computer data storage unit (not shown) that is coupled to computing system 100 or to another computing system (not shown). Furthermore, the updated patterns resulting from step 220 (see FIG. 2) and/or the one or more corrective actions determined in step 210 (see FIG. 2) may be stored by computing system 300 in computer data storage unit 312 or in another computer data storage unit (not shown), which may be coupled to computing system 300 or to another computing system (not shown).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system" (e.g., system 100 or computing system 300). Furthermore, the present invention may take the form of a computer program product embodied in any tangible medium of expression (e.g., memory 304 or computer data storage unit 312) having computer-usable program code (e.g., code 314) embodied in the medium.

Any combination of one or more computer-usable or computer-readable medium(s) (e.g., memory 304 and computer data storage unit 312) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., code 314) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer (e.g., computing system 300), partly on the user's computer, as a stand-alone software package, partly on the user's computer and partly on a remote computer or entirely on the remote computer or server. In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIG. 2) and/or block diagrams of methods, apparatus (systems) (e.g., FIG. 1 and FIG. 3), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 314). These computer program instructions may be provided to a processor (e.g., CPU 302) of a general purpose computer (e.g., computing system 300), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 304 or computer data storage unit 312) that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computing system 300) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart in FIG. 2 and the block diagrams in FIGS. 1 & 3 illustrate the architecture, functionality, and operation of possible implementations of systems, methods, and computer program products according to various embodiments of the present invention. In this regard, each block in the flowchart or block diagrams may represent a module, segment, or portion of code (e.g., code 314), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of automatically resolving a voice quality problem in real time in a communication system, said method comprising: receiving, by a computing system and from a plurality of reporter services, a plurality of measurements of a plurality of characteristics of a voice transmission, wherein said plurality of reporter services is a plurality of service-oriented architecture (SOA) service requesters; aggregating, by said computing system and subsequent to said receiving said plurality of measurements, said plurality of measurements into a combination of measurements; determining, by an analyzer included in said computing system and subsequent to said aggregating, that said combination of measurements indicates a voice quality problem, wherein said voice quality problem is a problem with a quality of a voice being transmitted by said voice transmission, wherein said determining that said combination of measurements indicates said voice quality problem includes identifying a match between said combination of measurements and a pattern of predefined conditions stored in a database residing in a computer data storage unit, and wherein said analyzer is a SOA service provider; identifying, by said analyzer and subsequent to said determining, one or more corrective actions, wherein said one or more corrective actions are associated in said database with said pattern of predefined conditions; an enterprise service bus (ESB) specifying one or more fixer services that are one or more SOA service providers to execute said one or more corrective actions to resolve said voice quality problem, wherein said ESB is a connectivity infrastructure that manages said plurality of reporter services, said analyzer, and said one or more fixer services based on said reporter services being said SOA service requesters, said analyzer being said SOA service provider, and said one or more fixer services being said one or more SOA service providers; executing, by said one or more fixer services included in said computing system and subsequent to said identifying said one or more corrective actions and said specifying said one or more fixer services, said one or more corrective actions, wherein a result of said executing is a resolution of said voice quality problem; subsequent to said executing said one or more corrective actions, said computing system receiving a new voice quality problem different from said voice quality problem and in response, expanding said computing system by adding a new reporter service as a new SOA service requester to said plurality of reporter services, and by adding a new fixer service as a new SOA service provider to said one or more fixer services, wherein said new reporter service requests a new measurement of another characteristic of said voice transmission, wherein said new fixer service executes another corrective action to resolve said new voice quality problem, wherein said adding said new reporter service to said plurality of reporter services and said adding said new fixer service to said one or more fixer services are based on said plurality of reporter services and said one or more fixer services being expandable by being included in a SOA as said SOA service requesters and said one or more SOA service providers, respectively.

2. A computing system comprising a processor and a computer-readable storage unit coupled to said processor, said storage unit containing instructions that when executed by said processor implement a method of automatically resolving a voice quality problem in real time in a communication system, said method comprising: receiving, from a plurality of reporter services, a plurality of measurements of a plurality of characteristics of a voice transmission, wherein said plurality of reporter services is a plurality of service-oriented architecture (SOA) service requesters; aggregating, subsequent to said receiving said plurality of measurements, said plurality of measurements into a combination of measurements; determining, by an analyzer included in said computing system and subsequent to said aggregating, that said combination of measurements indicates a voice quality problem, wherein said voice quality problem is a problem with a quality of a voice being transmitted by said voice transmission, wherein said determining that said combination of measurements indicates said voice quality problem includes identifying a match between said combination of measurements and a pattern of predefined conditions stored in a database residing in a computer data storage unit, and wherein said analyzer is a SOA service provider; identifying, by said analyzer and subsequent to said determining, one or more corrective actions, wherein said one or more corrective actions are associated in said database with said pattern of predefined conditions; an enterprise service bus (ESB) specifying one or more fixer services that are one or more SOA service providers to execute said one or more corrective actions to resolve said voice quality problem, wherein said ESB is a connectivity infrastructure that manages said plurality of reporter services, said analyzer, and said one or more fixer services based on said reporter services being said SOA service requesters, said analyzer being said SOA service provider, and said one or more fixer services being said one or more SOA service providers; executing, by said one or more fixer services included in said computing system and subsequent to said identifying said one or more corrective actions and said specifying said one or more fixer services, said one or more corrective actions, wherein a result of said executing is a resolution of said voice quality problem; subsequent to said executing said one or more corrective actions, receiving a new voice quality problem different from said voice quality problem and in response, expanding said computing system by adding a new reporter service as a new SOA service requester to said plurality of reporter services, and by adding a new fixer service as a new SOA service provider to said one or more fixer services, wherein said new reporter service requests a new measurement of another characteristic of said voice transmission, wherein said new fixer service executes another corrective action to resolve said new voice quality problem, wherein said adding said new reporter service to said plurality of reporter services and said adding said new fixer service to said one or more fixer services are based on said plurality of reporter services and said one or more fixer services being expandable by being included in a SOA as said SOA service requesters and said one or more SOA service providers, respectively.

3. A computer program product, comprising a computer readable storage unit coupled to a processor of a computing system, said computer readable storage unit storing instructions that are carried out by said processor to implement a method of automatically resolving a voice quality problem in real time in a communication system, said method comprising: receiving, from a plurality of reporter services, a plurality of measurements of a plurality of characteristics of a voice transmission, wherein said plurality of reporter services is a plurality of service-oriented architecture (SOA) service requesters; aggregating, subsequent to said receiving said plurality of measurements, said plurality of measurements into a combination of measurements; determining, by an analyzer included in said computing system and subsequent to said aggregating, that said combination of measurements indicates a voice quality problem, wherein said voice quality problem is a problem with a quality of a voice being transmitted by said voice transmission, wherein said determining that said combination of measurements indicates said voice quality problem includes identifying a match between said combination of measurements and a pattern of predefined conditions stored in a database residing in a computer data storage unit, and wherein said analyzer is a SOA service provider; identifying, by said analyzer and subsequent to said determining, one or more corrective actions, wherein said one or more corrective actions are associated in said database with said pattern of predefined conditions; an enterprise service bus (ESB) specifying one or more fixer services that are one or more SOA service providers to execute said one or more corrective actions to resolve said voice quality problem, wherein said ESB is a connectivity infrastructure that manages said plurality of reporter services, said analyzer, and said one or more fixer services based on said reporter services being said SOA service requesters, said analyzer being said SOA service provider, and said one or more fixer services being said one or more SOA service providers; executing, by said one or more fixer services included in said computing system and subsequent to said identifying said one or more corrective actions and said specifying said one or more fixer services, said one or more corrective actions, wherein a result of said executing is a resolution of said voice quality problem; subsequent to said executing said one or more corrective actions, receiving a new voice quality problem different from said voice quality problem and in response, expanding said computing system by adding a new reporter service as a new SOA service requester to said plurality of reporter services, and by adding a new fixer service as a new SOA service provider to said one or more fixer services, wherein said new reporter service requests a new measurement of another characteristic of said voice transmission, wherein said new fixer service executes another corrective action to resolve said new voice quality problem, wherein said adding said new reporter service to said plurality of reporter services and said adding said new fixer service to said one or more fixer services are based on said plurality of reporter services and said one or more fixer services being expandable by being included in a SOA as said SOA service requesters and said one or more SOA service providers, respectively.

4. A method of optimizing a selection of a set of one or more corrective actions to attempt to resolve a voice quality problem, said method comprising: a computer system storing first and second sets of one or more corrective actions for resolving any voice quality problem indicated by a combination of measurements of characteristics of a voice transmission, wherein a result of said storing said first and second sets of one or more corrective actions is an association of said combination of measurements with said first and second sets of one or more corrective actions; said computer system storing a first ranking of said first set of one or more corrective actions and a second ranking of said second set of one or more corrective actions, said first ranking being initially greater than said second ranking; said computer system storing a first preference of selecting said first set of one or more corrective actions instead of said second set of one or more corrective actions to attempt to resolve any voice quality problem indicated by said combination of measurements, based on said first ranking being initially greater than said second ranking; said computer system receiving said combination of measurements in response to first measurements of said characteristics of a first voice transmission; said computer system identifying a first voice quality problem based on said combination of measurements received in response to said first measurements; said computer system selecting and retrieving said first set of one or more corrective actions instead of said second set of one or more corrective actions to attempt to resolve said first voice quality problem based on said first ranking being initially greater than said second ranking and based on said first preference of selecting said first set of one or more corrective actions instead of said second set of one or more corrective actions to attempt to resolve any voice quality problems indicated by said combination of measurements; subsequent to said selecting and retrieving said first set of one or more corrective actions, said computer system executing said first set of one or more corrective actions in a first attempt to resolve said first voice quality problem and in response, determining that said executing said first set of one or more corrective actions does not resolve said first voice quality problem; in response to said determining that said executing said first set of one or more corrective actions does not resolve said first voice quality problem, said computer system updating said first ranking relative to said second ranking so that said second ranking is greater than said first ranking; subsequent to said updating said first ranking relative to said second ranking, said computer system receiving said combination of measurements in response to second measurements of said characteristics of a second voice transmission; said computer system identifying a second voice quality problem based on said combination of measurements received in response to said second measurements; said computer system self-optimizing a selection of said second set of one or more corrective actions to resolve said second voice quality problem, wherein said self-optimizing includes: said computer system replacing said first preference of selecting said first set of one or more corrective actions with a second preference of selecting said second set of one or more corrective actions instead of said first set of one or more corrective actions to attempt to resolve any voice quality problem indicated by said combination of measurements, based on said second ranking being greater than said first ranking; said computer system storing said second preference in association with said combination of measurements; subsequent to said identifying said second voice quality problem, said computer system retrieving said second preference based on said combination of measurements being a basis for said second voice quality problem; and said computer system selecting and retrieving said second set of one or more corrective actions instead of said first set of one or more corrective actions for an initial attempt to resolve said second voice quality problem based on said retrieved second preference of selecting said second set of one or more corrective actions instead of said first set of one or more corrective actions to attempt to resolve any voice quality problem indicated by said combination of measurements; and subsequent to said selecting and retrieving said second set of one or more corrective actions, said computer system executing said second set of one or more corrective actions in a second attempt to resolve said second voice quality problem and in response, determining that said executing said second set of one or more corrective actions resolves said second voice quality problem.

* * * * *